(12) United States Patent
Mishina (10) Patent No.: US 6,393,329 B1
(45) Date of Patent: May 21, 2002

(54) BASE BOARD, POWER SUPPLY UNIT AND CPU UNIT MOUNTED THEREON IN PROGRAMMABLE CONTROLLER SYSTEM

(75) Inventor: Kazuhiro Mishina, Shiga (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/129,559

(22) Filed: Aug. 5, 1998

(30) Foreign Application Priority Data

Aug. 26, 1997 (JP) ............................................. 9-229950

(51) Int. Cl.$^7$ .............................................. G05B 15/00
(52) U.S. Cl. ................................ 700/1; 700/11; 700/23; 700/24; 713/100
(58) Field of Search .............................. 700/1, 121, 11, 700/23, 24; 710/44, 46, 48; 395/275, 200; 371/34; 713/100

(56) References Cited

U.S. PATENT DOCUMENTS

| | | | |
|---|---|---|---|
| 4,180,862 A | * 12/1979 | Seipp | |
| 4,275,455 A | * 6/1981 | Bartlett | ........................ 364/130 |
| 4,307,447 A | * 12/1981 | Provanzano et al. | |
| 4,477,882 A | * 10/1984 | Schumacher et al. | ....... 709/251 |
| 5,455,911 A | * 10/1995 | Johansson | .................... 710/44 |
| 5,956,665 A | * 9/1999 | Martinez et al. | ............ 702/188 |

FOREIGN PATENT DOCUMENTS

| | | |
|---|---|---|
| JP | 1-17607 A | 7/1989 |
| JP | 2-116903 A | 5/1990 |
| JP | 2-176833 | 7/1990 |
| JP | 4-308952 | 10/1992 |

* cited by examiner

Primary Examiner—Ayaz Sheikh
Assistant Examiner—Firmin Backer
(74) Attorney, Agent, or Firm—Fish & Richardson PC

(57) ABSTRACT

A programmable controller system is disclosed. The system comprises a base board having a plurality of slot, a power supply unit attached to at least one of the slots for supplying power to the base board, a CPU unit attached to at least one of the slots for outputting an I/O unit specification signal for specifying one executing I/O unit from among at least one I/O unit attached to ones of the remaining slots for executing I/O processing, discrimination means for discriminating amount of shifted position of the I/O unit which is changed in accordance with number of slot occupied by the power supply unit and the CPU unit, correction means for correcting the I/O unit specification signal based on the amount of shifted position of the I/O unit discriminated by the discrimination means, selection means for selecting one actual slot in which the I/O unit specified by the I/O unit specification signal is attached based on the corrected I/O specification signal.

13 Claims, 10 Drawing Sheets

| | $P_1$ | $P_2$ |
|---|---|---|
| FUNDAMENTAL BASE BOARD CPU UNIT: SLOT 0, 1 | 1 | 0 |
| FUNDAMENTAL BASE BOARD CPU UNIT: SLOT 1, 2 | 1 | 1 |
| EXTENSION BASE BOARD | 0 | 0 |

| | UNIT WIDTH | | IDENTIFICATION SIGANL | | | | | | OUTPUT SIGNAL | | |
|---|---|---|---|---|---|---|---|---|---|---|---|
| | POWER SOURCE UNIT | CPU UNIT | S₁ | S₂ | S₃ | S₄ | S₅ | S₆ | Q₁ | Q₂ | Q₃ |
| FUNDAMENTAL BASE BOARD | 1 | 1 | 0 | 1 | 0 | 1 | 0 | 0 | 1 | 1 | 0 |
| | 2 | 1 | 1 | 0 | 0 | 1 | 1 | 0 | 1 | 0 | 1 |
| | 1 | 2 | 0 | 1 | 0 | 0 | 1 | 0 | 1 | 0 | 1 |
| | 2 | 2 | 1 | 0 | 1 | 1 | 0 | 1 | 1 | 1 | 1 |
| EXTENSION BASE BOARD | 1 | * | 1 | 1 | 0 | 0 | 0 | 0 | 0 | 0 | 0 |
| | 2 | * | 1 | 1 | 0 | 1 | 0 | 0 | 0 | 1 | 0 |

BASE BOARD, POWER SUPPLY UNIT AND CPU UNIT MOUNTED THEREON IN PROGRAMMABLE CONTROLLER SYSTEM

BACKGROUND OF THE INVENTION

1. Technical Field of the Invention

The present invention relates to a programmable controller system including a base board, and a power supply unit and a CPU unit which are to be mounted on the base board.

2. Background of the Related Art

Conventionally, there has been a system, such as a programmable controller, having a configuration in which various units are mounted on a base board (see Unexamined Japanese Patent Publications No. Hei-4-308952, No. Hei-2-116903, No. Hei-1-175607, No. Hei-2-176833, or the like).

Figure 13:
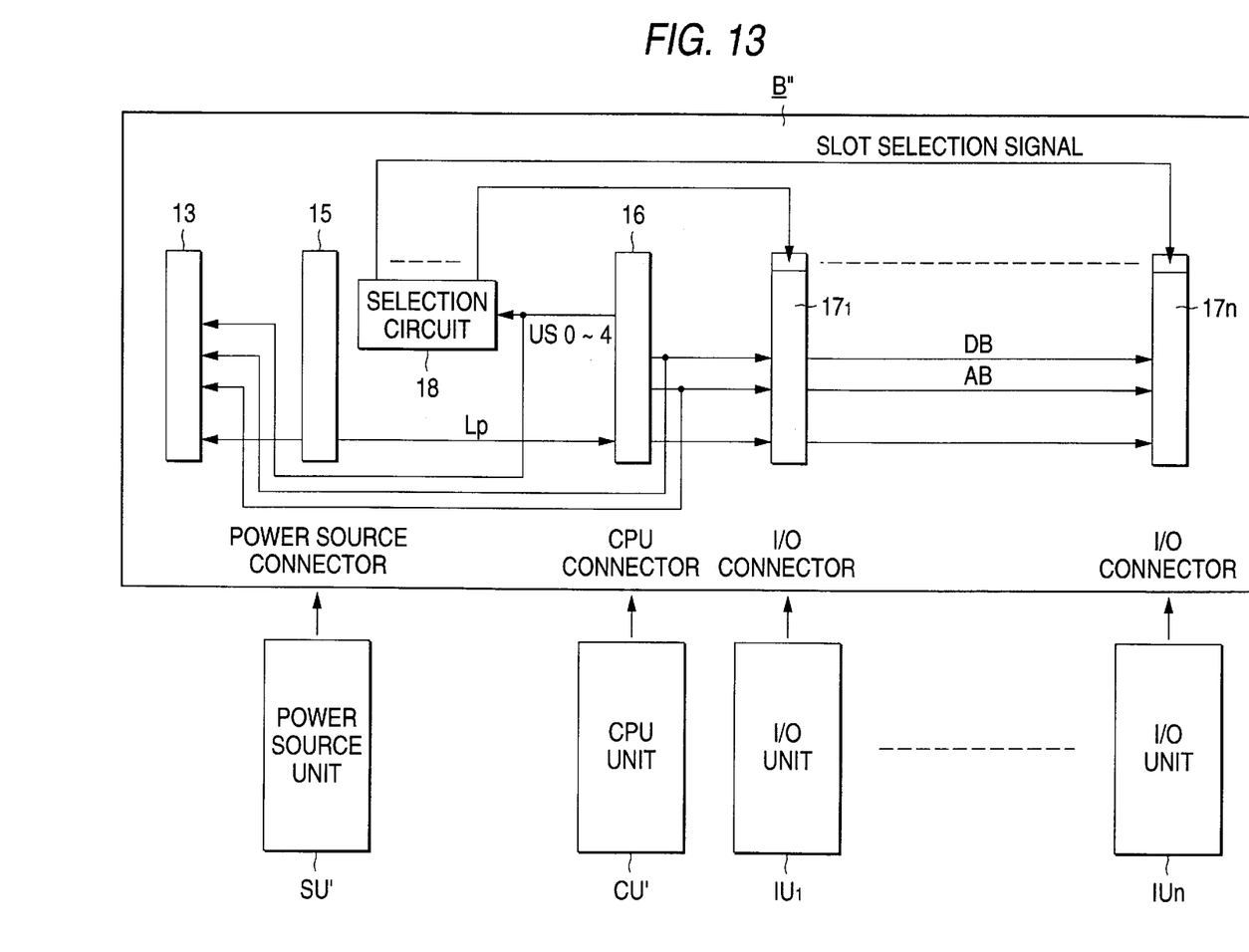
FIG. 13 is a schematic configuration diagram showing a conventional system.

FIG. 13 is a diagram showing a system configuration of a conventional programmable controller system constituted by a base board B", a power supply unit SU' for supplying power, a CPU unit CU' for performing input/output processing and various arithmetical operations, input/output units (I/O units) $IU_1, \ldots, IU_n$ for input/output operations, and so on, those units being mounted on the base board B". The power supply unit SU', the CPU unit CU', the I/O units $IU_1, \ldots, IU_n$ are attached to slots provided in the base board B" respectively, and have mating connectors which are to be connected to connectors provided in the respective slots. The base board B" to which the CPU unit CU' is to be attached is called a fundamental base board. On the other hand, there is also an extension base board connected to an extension connector 13 provided in the base board B" through an extension cable, and used for extending the I/O units $IU_1, \ldots, IU_n$ and so on. Basically, only the power supply unit SU', the I/O units $IU_1, \ldots, IU_n$ and so on, are attached to such an extension base board, but the CPU unit CU' is not attached thereto. In the figures, the CPU unit CU' is shown as an unit occupying two slots.

In the fundamental base board B", a power supply connector 15 to which the power supply unit SU' is to be connected, a CPU connector 16 to which the CPU unit CU' is to be connected, I/O connectors $17_1, \ldots, 17_n$ to which the I/O units $IU_1, \ldots, IU_n$ are to be connected, and the extension connector 13 are connected through a power supply line Lp, while an address bus AB and a data bus DB are provided among the CPU connector 16, the I/O connectors $17_1, \ldots, 17_n$ and the extension connector 13.

In addition, base board selection signals US3 and US4 for selecting the fundamental base board B" and the extension base board respectively, and I/O selection signals US0 to US2 for selecting the I/O units $IU_1, \ldots, IU_n$ attached to the slots of the respective base boards are outputted from the CPU unit CU'. These selection signals are supplied through the CPU connector 16 to a select circuit 18 provided on the fundamental base board B". In the select circuit 18, slot selection signals are supplied to selected ones of the I/O connectors $17_1, \ldots, 17_n$ connected to the I/O units $IU_1, \ldots, IU_n$ in accordance with the supplied selection signals. In such a manner, input/output of data is performed through the address bus and the data bus between the I/O units $IU_1, \ldots, IU_n$ supplied with the slot selection signals through the I/O connectors $17_1, \ldots, 17_n$ and the CPU unit CU'.

On the other hand, the respective slots are arranged in a row in the fundamental base board B" and the extension base board B'". Attached to the respective slots 0, . . . , n, the power supply unit SU', the CPU unit CU', and the I/O units $IU_1, \ldots, IU_n$ are disposed side by side adjacently as shown in FIG. 14(a).

Figure 14:
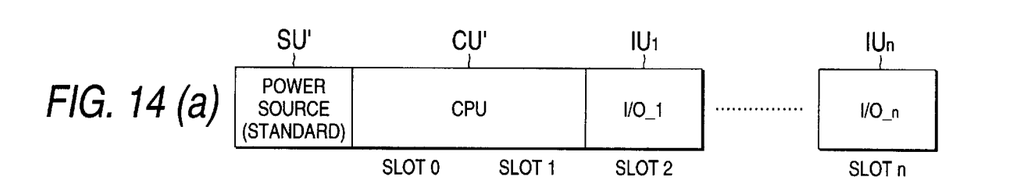
FIGS. 14(a)–(c) are diagrams showing examples of system configurations in the conventional system.

However, when the power supply unit is a high capacity power supply unit SU", the body size thereof is so large that the power supply unit occupies two slots (the power supply slot and the slot 0) of the fundamental base board B" as shown in FIG. 14(b). In this case, since the slot 0 to which the CPU unit CU' is to be attached originally is occupied by the power supply unit SU", the CPU unit CU' must be shifted so as to be attached to the adjacent slot 1. Then, the slots to which the I/O units $IU_1, \ldots, IU_n$ are to be attached are shifted one by one successively in such a manner that, for example, the slot to which the I/O unit $IU_1$ is to be attached is shifted from the slot 1 to the slot 2. Therefore, there is a problem that the select numbers of the I/O units $IU_1, \ldots, IU_n$ (the numbers for identifying the I/O units $IU_1, \ldots, IU_n$) change when wiring is made so as to fix the slot selection signals from the select circuit 18 as described above. In addition, when the fundamental base board B" and the extension board are compared with each other, the physical positions of the slots and select numbers become different in accordance with presence or absence of the attachment of the CPU unit CU' as shown in FIGS. 14(a) and (b). It is therefore necessary to provide the fundamental base board B" and the extension board separately since the base boards cannot be used with each other commonly.

SUMMARY OF THE INVENTION

It is an object of the present invention to solve the foregoing problem, that is, to provide a base board, and a power supply unit and a CPU unit which are attached to the base board, in which slots to which I/O units and so on are attached can be recognized properly even when the width of the power supply unit and the CPU unit are changed independently and respectively, or even when the CPU unit is not attached.

To achieve the above object, according to the present invention, there is provided a programmable controller system comprising: a base board having a plurality of slot; a power supply unit attached to at least one of the slots for supplying power to the base board; a CPU unit attached to at least one of the slots for outputting an I/O unit specification signal for specifying one executing I/O unit from among at least one I/O unit attached to ones of the remaining slots for executing I/O processing; discrimination means for discriminating amount of shifted position of the I/O unit which is changed in accordance with number of slot occupied by the power supply unit and the CPU unit; correction means for correcting the I/O unit specification signal based on the amount of shifted position of the I/O unit discriminated by the discrimination means; selection means for selecting one actual slot in which the I/O unit specified by the I/O unit specification signal is attached based on the corrected I/O specification signal.

Specifically, the discrimination means includes a first circuit having an unchanged configuration, a second circuit having a variable configuration according to the number of slot occupied by the power supply unit, and a third circuit having a variable configuration according to the number of slot occupied by the CPU unit, and wherein the amount of shifted position of the I/O unit is uniquely determined by a combination of the first circuit, the second circuit, and the third circuit.

The first circuit is a logic circuit provided on the base board, the second circuit is provided in the power supply unit, and the third circuit is provided in the CPU unit, and the first circuit, the second circuit and the third circuit uniquely form a discrimination circuit outputting a discrimination signal to the correction means when the power supply unit is attached to the base board.

In the system, it is possible to obtain different identification signals respectively when the widths of the power supply unit and the CPU unit occupying the slots of the base board are changed independently, or when the CPU unit is not attached. Accordingly, even in such a case, it is possible to properly recognize the slots to which I/O units and so on are attached.

Furthermore, according to the present invention, there is also adopted a method for switching a function of a base board in the programmable controller system. The method comprises the steps of: attaching a power supply unit for supplying power to the base board to at least one of a plurality of slots provided on the base board; attaching removably to one of the slot a CPU unit for outputting an I/O unit specification signal for specifying one executing I/O unit from among at least one I/O unit attached to ones of the remaining slots for executing I/O processing; detecting whether the CPU unit is attached to the base board; when presence of attachment of the CPU unit is detected, discriminating amount of shifted position of the I/O unit which is changed in accordance with number of slot occupied by the power supply unit and the CPU unit; correcting the I/O unit specification signal based on the amount of shifted position of the I/O unit discriminated by the discrimination means; selecting one actual slot in which the I/O unit specified by the I/O unit specification signal is attached based on the corrected I/O specification signal; and switching a control signal terminal provided on the base board as an output terminal, and when absence of attachment of the CPU unit is detected, switching the control signal terminal as an input terminal and taking in the I/O unit specification signal from an external unit through the control terminal; discriminating amount of shifted position of the I/O unit which is changed in accordance with number of slot occupied by the power supply unit; correcting the I/O unit specification signal based on the amount of shifted position of the I/O unit discriminated by the discrimination means; and selecting one actual slot in which the I/O unit specified by the I/O unit specification signal is attached based on the corrected I/O specification signal.

In the method, when the absence of the CPU unit is detected, the amount of shifted position of the I/O unit is uniquely determined by combining a first circuit and a second circuit, the first circuit is provided in the base board with a unchanged configuration and the second circuit is provided in the power supply unit with a various configuration according to the number of slot occupied by the power supply unit.

In the method, when the presence of the CPU unit is detected, the amount of shifted position of the I/O unit is uniquely determined by combining a first circuit, a second circuit, and a third circuit, the first circuit is provided in the base board with a unchanged configuration, the second circuit is provided in the power supply unit with a various configuration according to the number of slot occupied by the power supply unit, and the third circuit is provided in the CPU unit with a various configuration according to the number of slot occupied by the CPU unit.

Accordingly, one and the same base board can be used in common both as the fundamental base board and the extension base board in accordance with the presence or absence of attachment of the CPU unit.

DETAILED DESCRIPTION OF THE PREFERRED EMBODIMENTS

Preferred embodiments will be described below in detail with reference to the accompanying drawings. In the embodiments, the present invention is applied to a programmable controller system. However, the present invention may be applied to other than the programmable controller system without departing from the scope and spirit of the invention.

Figure 1:
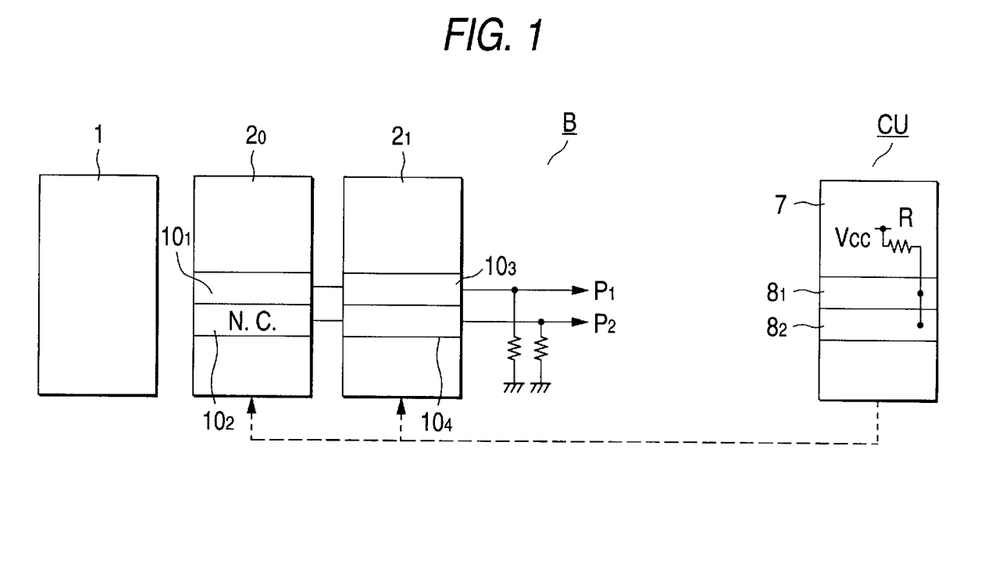
FIG. 1 is a schematic configuration diagram showing a first embodiment according to the present invention.
Figure 2:
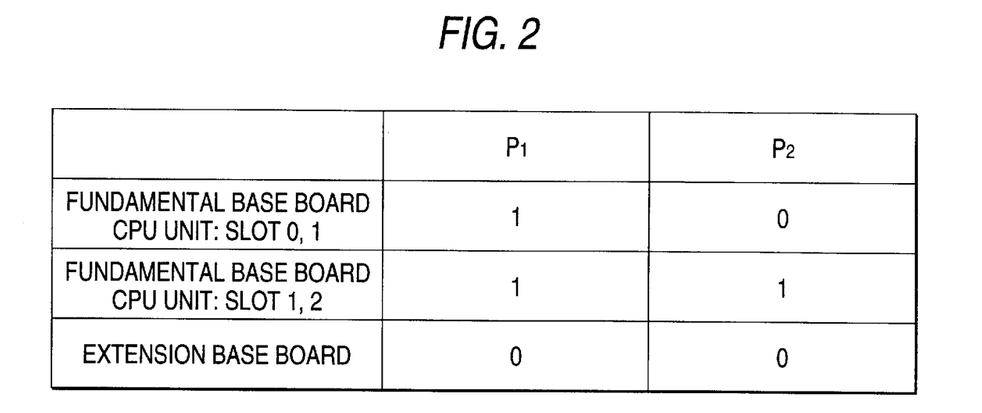
FIG. 2 is a diagram showing signals in every system configuration in the first embodiment.

FIG. 1 shows a schematic configuration of a first embodiment according to the present invention. A base board B comprises a power supply slot having a power supply connector 1, slots 0 and 1 being adjacent to the power supply slot and respectively having connectors $2_0$, $2_1$ in which pairs of signal terminals $10_1$ to $10_4$ respectively connected to the ground through a resistor are provided. A CPU unit CU comprises a mating connector 7 having a pair of signal terminals $8_1$ and $8_2$ which are pulled up by a resistor R. According to the base board B, various combinations of signals $P_1$ and $P_2$ can be obtained in the cases where the CPU unit CU is attached to the slots 0 and 1 of the fundamental base board B, where it is attached to the slots 1 and 2, and where is not attached, respectively as shown in FIG. 2.

Figure 3:
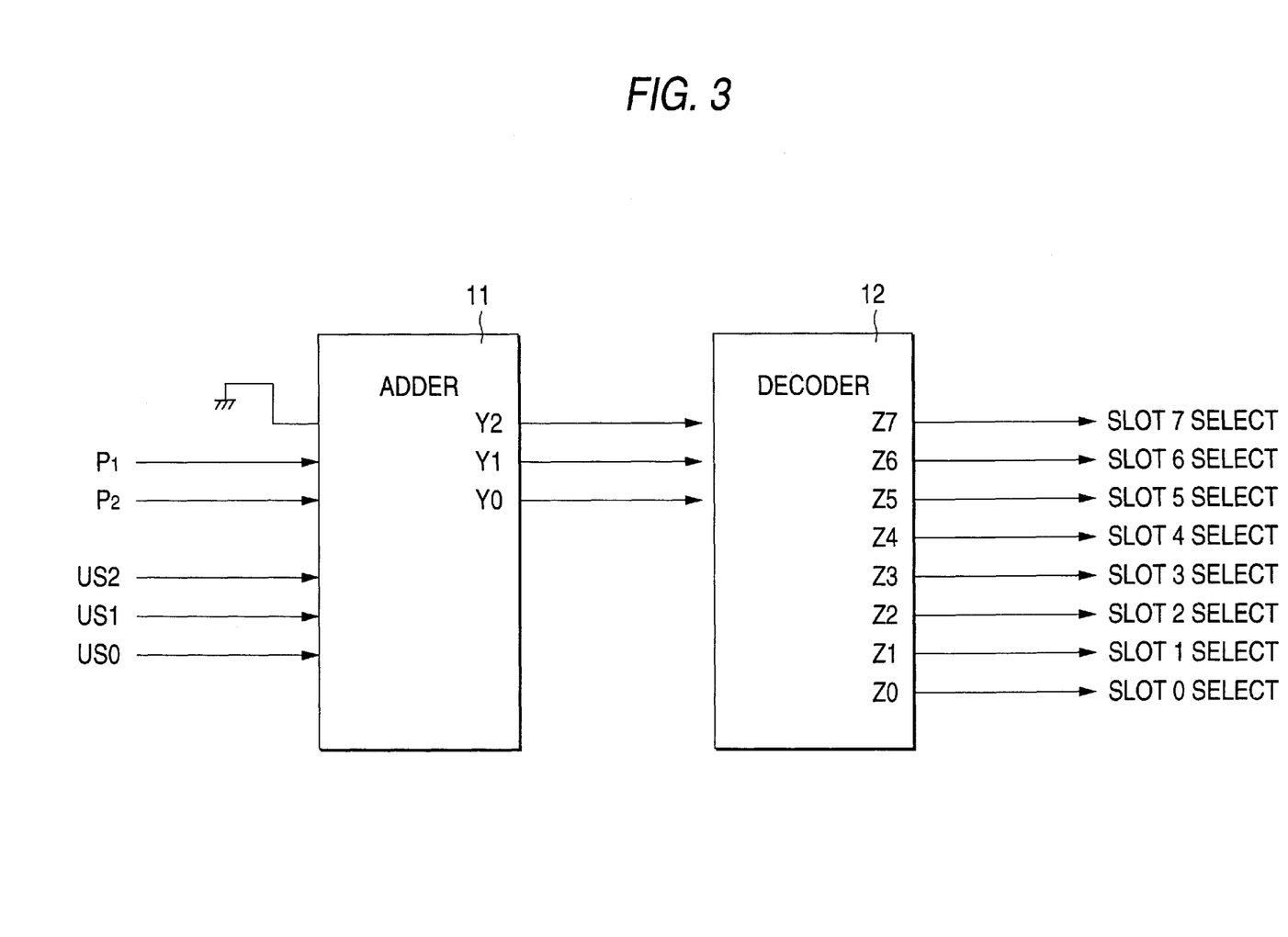
FIG. 3 is a circuit configuration diagram of a main part in the first embodiment.

In this base board B, there are provided an adder 11 for adding selection signals US0 to US2 of "0" or "1" for selecting slots 0 to 7, to a signal taking the signal $P_2$ as its least significant digit and the signal $P_1$ as its higher digit, and a decoder 12 for decoding outputs Y0 to Y2 of the adder 11 to obtain selection signals Z0 to Z7 for selecting the slots 0 to 7, as shown in FIG. 3. Consequently, with respect to the same selection signals US0 to US2, different select signals can be outputted in accordance with the slot 0 or 1 to which the CPU unit CU is attached. For example, assume that the selection signals US0 to US2 indicate "000" for selecting an I/O unit corresponding to the select number 1. In this case, when the CPU unit CU is attached to the slots 0 and 1, the output of the adder 11 takes "010" to thereby select the slot 2. On the other hand, when the CPU unit CU is attached to the slots 1 and 2, the output of the adder 11 takes "011" to thereby select the slot 3. A proper slot to which the I/O unit is attached corresponding to the select number 1 can be always selected no matter the CPU unit CU is attached to the slot 0 or the slot 1.

Figure 4:
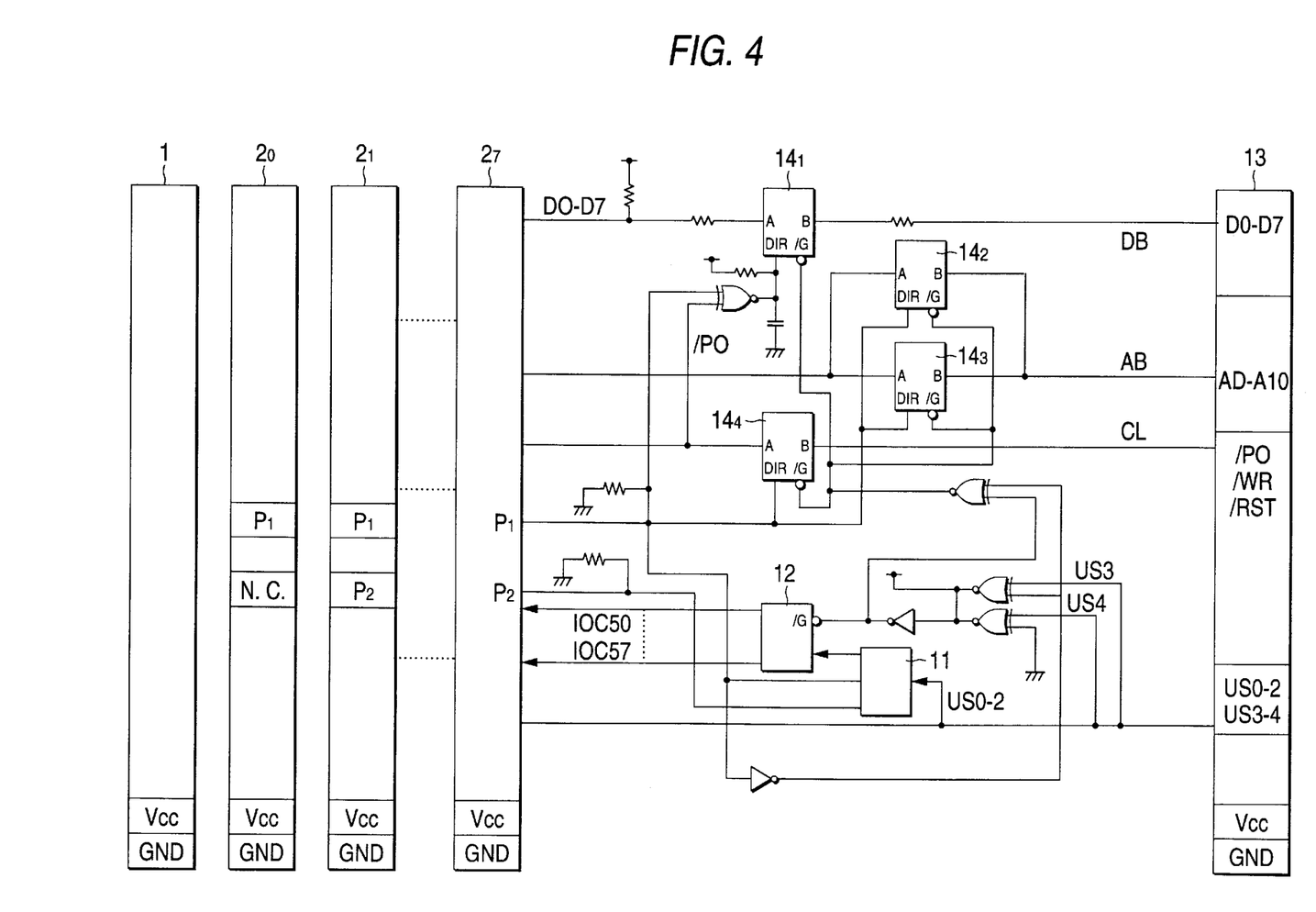
FIG. 4 is a circuit configuration diagram of a main part of a base board in the first embodiment.

Further in the fundamental base board B, buffer circuits $14_1$ to $14_4$ which can switch the signal transmission directions of a data bus DB, an address bus AB and a control signal line CL are provided in the upstream of an extension connector 13 as shown in FIG. 4. Of those buffer circuits, the buffer circuits $14_2$ and $14_3$ for the address bus AB and the buffer circuit $14_4$ for the control signal line CL are designed so as to switch the signal transmission directions in accordance with the signal $P_1$. That is, when the signal $P_1$ takes "1", respective signals are outputted to the extension connector 13 so that the base board functions as a fundamental base board. When the signal $P_1$ takes "0", respective signals are inputted from the extension connector 13 so that the base board functions as an extension base board.

In addition, the buffer circuit $14_1$ for the data bus DB is designed so that the signal transmission direction thereof can be switched by the signal $P_1$ and an RD (read) signal of the control signals. In reading with the signal $P_1$ taking "1", respective signals are inputted from the extension connector 13 so that the base board functions as a fundamental base board, while in reading with the signal $P_1$ taking "0", respective signals are outputted from the extension connector 13 so that the base board functions as extension base board. The signals US3 and US4 for selecting the fundamental base board and the extension base board, and the signals US0 to US2 for selecting the respective slots 0 to 7 are directly exchanged, not through the buffer circuits $14_1$ to $14_4$, as mentioned above.

Figure 5:
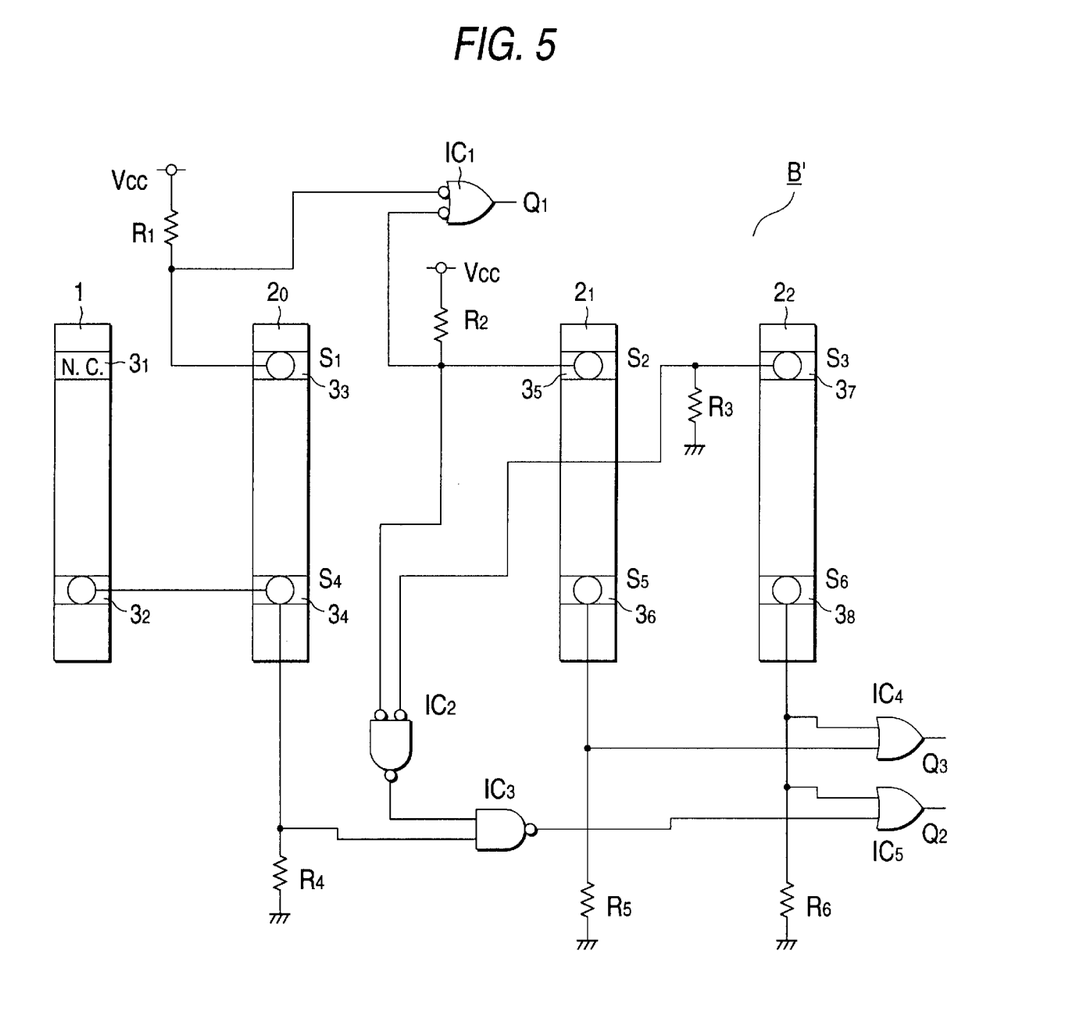
FIG. 5 is a circuit configuration diagram showing a main part of a second embodiment according to the present invention.

FIG. 5 shows a main part circuit diagram of a base board B' of a second embodiment according to the present invention. Pairs of slot-side identification signal terminals $3_1$ to $3_8$, 8 in total, are provided in the same positions of a power supply connector 1 and connectors $2_0$ to $2_2$ provided on the base board B', respectively. The base board B' has other slots and connectors, though they are omitted in the illustration.

One slot-side identification signal terminal $3_1$ provided in the power supply connector 1 is made open (N.C.), while the other slot-side identification signal terminal $3_2$ is connected to the slot-side identification signal terminal $3_4$ provided in the same position of the connector $2_0$.

The above-mentioned slot-side identification signal terminal $3_4$ provided in connector $2_0$ is connected to the ground through a resistor $R_4$, while the other slot-side identification signal terminal $3_3$ is connected to a power source $V_{cc}$ through a pull-up resistor $R_1$. In addition, one slot-side identification signal terminal $3_5$ provided in the connector $2_1$ is connected to the power source $V_{cc}$ through a pull-up resistor $R_2$, while the other slot-side identification signal terminal $3_6$ is connected to the ground through a resistor $R_5$. Further, one slot-side identification signal terminal $3_7$ provided in connector $2_2$ is connected to the ground through a resistor $R_3$, while the other slot-side identification signal terminal $3_8$ is connected to the ground through a resistor $R_6$.

Figure 6:
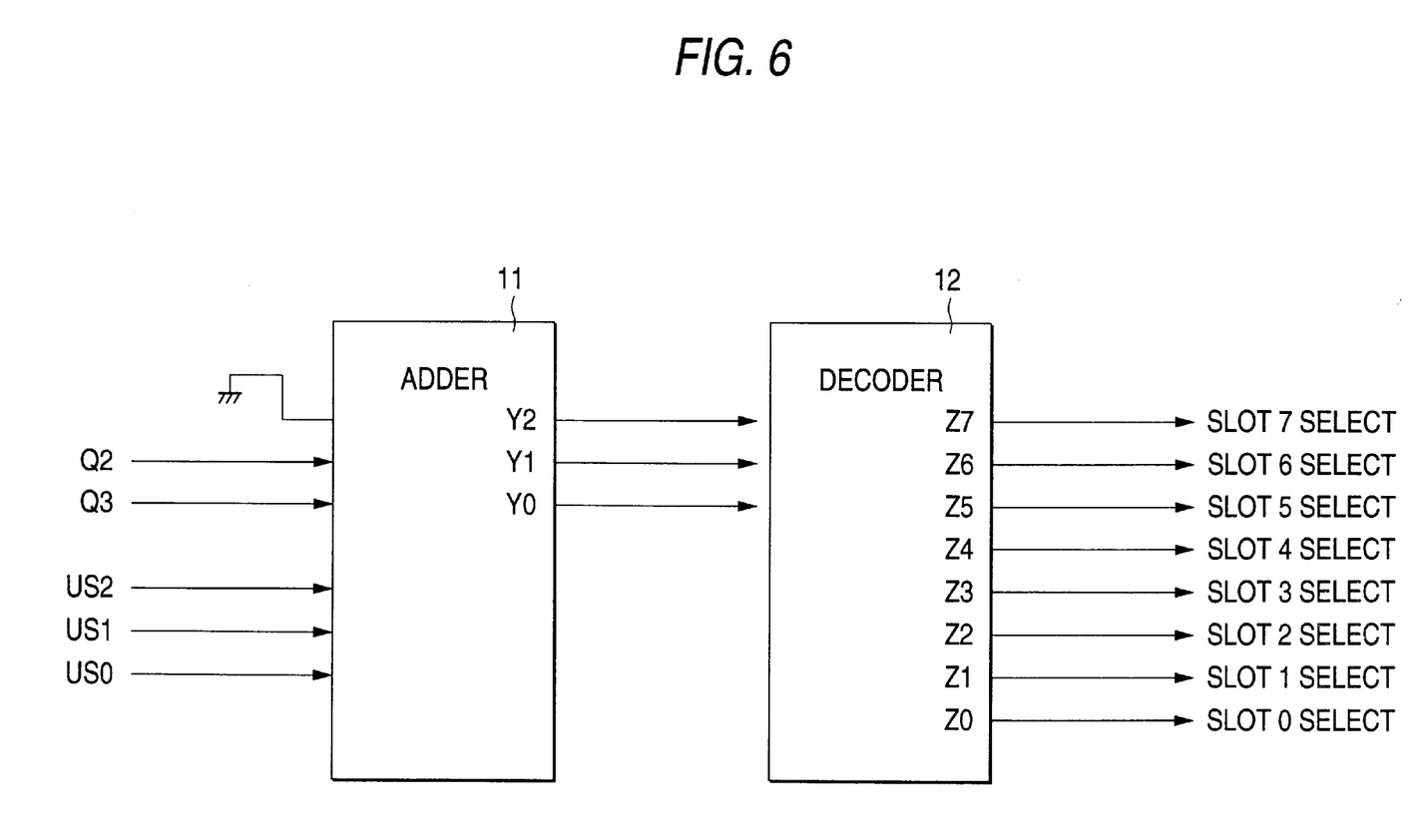
FIG. 6 is a circuit configuration diagram of the other main part of the second embodiment.

In addition, the base board B' is provided with a logic circuit $IC_1$ for operating NAND between an identification signal $S_1$ inputted to the slot-side identification signal terminal $3_3$ and an identification signal $S_2$ inputted to the slot-side identification signal terminal $3_5$. An output signal $Q_1$ of this logic circuit $IC_1$ will be a signal designating the attachment of a CPU unit CU in the base board B'. Further, the base board B' is provided with a logic circuit $IC_2$ for operating OR between the identification signal $S_2$ inputted to the slot-side identification signal terminal $3_5$ and an identification signal $S_3$ inputted to the slot-side identification signal terminal $3_7$, a logic circuit $IC_3$ for operating AND between an output signal of this logic circuit $IC_2$ and an identification signal $S_4$ inputted to the slot-side identification signal terminal $3_4$, a logic circuit $IC_5$ for operating OR between an output signal of this logic circuit $IC_3$ and an identification signal $S_6$ inputted to the slot-side identification signal terminal $3_8$, and a logic circuit $IC_4$ for operating OR between an identification signal $S_5$ inputted to the slot-side identification signal terminal $3_6$ and the above-mentioned identification signal $S_6$. Here output signals (correction signals) $Q_3$, $Q_2$ of the logic circuits $IC_4$ and $IC_5$ are inputted to the adder 11 shown in FIG. 6, respectively.

Figure 7:
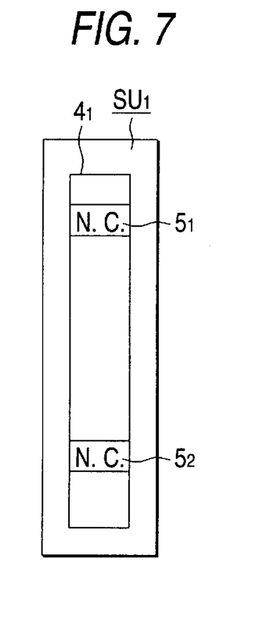
FIG. 7 is a schematic configuration diagram showing a standard type power supply unit in the second embodiment.
Figure 8:
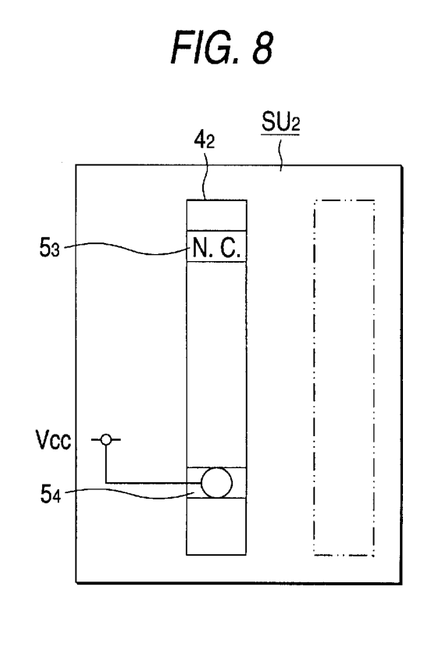
FIG. 8 is a schematic configuration diagram showing a high capacity power supply unit in the second embodiment.

FIG. 7 shows a standard type power supply unit $SU_1$ having a width which occupies only one slot (power supply slot), while FIG. 8 shows a high capacity power supply unit $SU_2$ which is wide enough to occupy two slots (the power supply slot and the slot 0). In a power supply connector $4_1$ provided in the standard type power supply unit $SU_1$, unit-side identification signal terminals $5_1$ and $5_2$ are provided in positions corresponding to the slot-side identification signal terminals $3_1$ and $3_2$ provided in the power supply connector 1 of the base board B'. Both the terminals $5_1$ and $5_2$ are made open (N.C.). On the other hand, the high capacity power supply unit $SU_2$ has a power supply connector $4_2$ to be connected to the power supply connector 1 of the base board B', and unit-side identification signal terminals $5_3$ and $5_4$ are provided in positions of this power supply connector $4_2$ corresponding to the slot-side identification signal terminals $3_1$ and $3_2$. One unit-side identification signal terminal $5_3$ is made open (N.C.), while the other unit-side identification signal terminal $5_4$ is connected to the power source $V_{cc}$.

Figure 9:
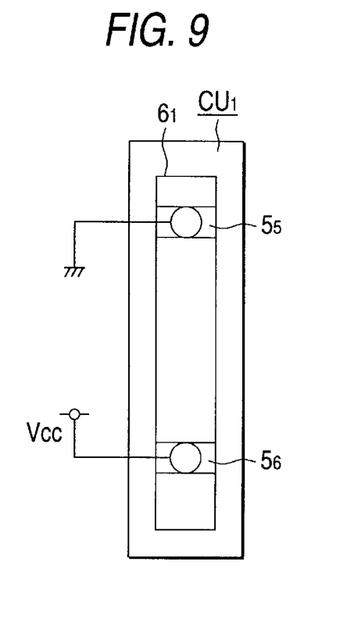
FIG. 9 is a schematic configuration diagram showing a standard type CPU unit in the second embodiment
Figure 10:
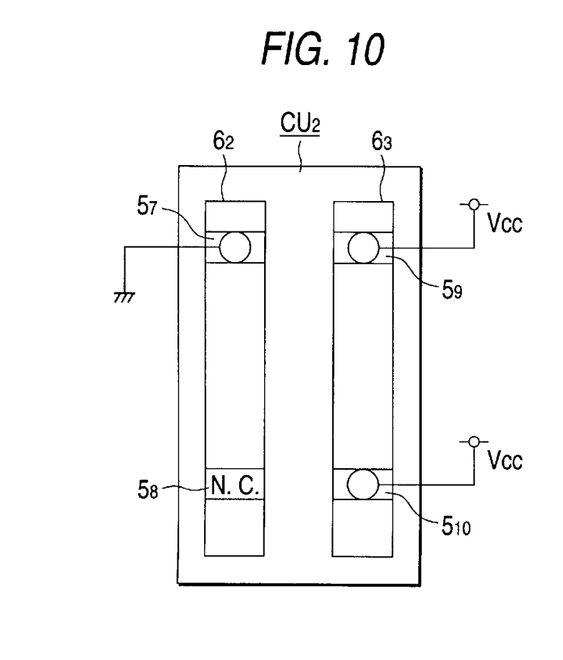
FIG. 10 is a schematic configuration diagram showing a high function CPU unit in the second embodiment.

FIG. 9 shows a standard type CPU unit $CU_1$ having a width which occupies only one slot, while FIG. 10 shows a high function CPU unit $CU_2$ which is wide enough to occupy two slots. In a connector $6_1$ provided in the standard type CPU unit $CU_1$, unit-side identification signal terminals $5_5$ and $5_6$ are provided in positions corresponding to the slot-side identification signal terminals $3_3$ and $3_6$ provided in the connectors $2_0$ and $2_1$ of the base board B'. One unit-side identification signal terminal $5_5$ is connected to the ground, while the other unit-side identification signal terminal $5_6$ is connected to the power source $V_{cc}$.

On the other hand, the high function CPU unit $CU_2$ has two connectors $6_2$ and $6_3$, and unit-side identification signal terminals $5_7$ to $5_{10}$ are provided in positions of the respective connectors $6_2$ and $6_3$ corresponding to the slot-side identification signal terminals $3_3$ to $3_6$ or $3_5$ to $3_8$. One unit-side identification signal terminal $5_7$ provided in the connector $6_2$ is connected to the ground, while the other unit-side identification signal terminal $5_8$ is made open (N.C.). In addition, both the unit-side identification signal terminals $5_9$ and $5_{10}$ provided in the connector $6_3$ are connected to the power source $V_{cc}$.

Figure 11:
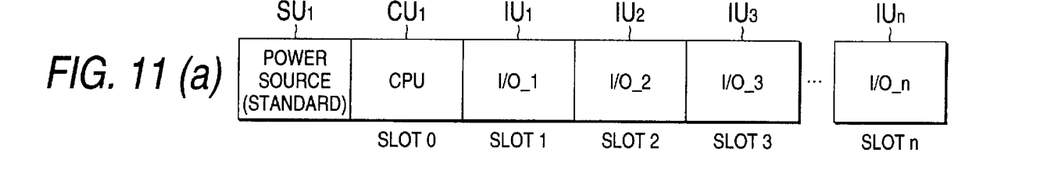
FIGS. 11(a)–(f) are diagrams showing examples of system configuration in the second embodiment.
Figure 12:
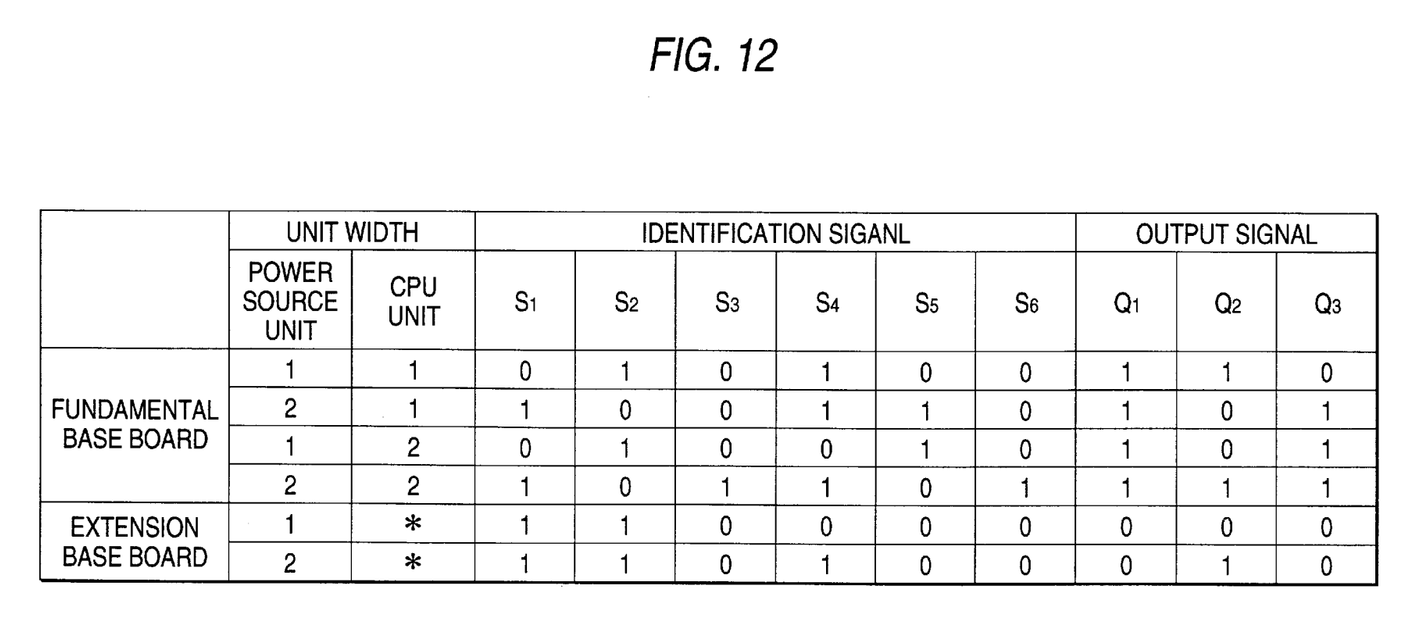
FIG. 12 is a diagram showing identification signals and output signals in every system configuration in the second embodiment.

The number of combinations to attach the power supply units $SU_1$ and $SU_2$, the CPU units $CU_1$ and $CU_2$, and the I/O units $IU_1, \ldots, IU_n$ to the respective slots of the base board B' arranged thus is six in total, as shown in FIGS. 11(*a*) to 11(*f*). Of them, in the combinations of FIGS. 11(*a*) to 11(*d*), the base board B' functions as a fundamental base board to which the CPU unit $CU_1$ or $CU_2$ is attached. In FIGS. 11(e) and 11(f), since neither the CPU unit $CU_1$ nor $CU_2$ is attached to the base board B', the base board B' functions as an extension base board. In addition, FIG. 12 shows identification signals $S_1$ to $S_6$ and output signals $Q_1$ to $Q_3$ in the respective combinations of FIGS. 11(a) to 11(f). In FIG. 12, the standard type power supply unit $SU_1$ is referred to as "1", and the high capacity power supply unit $SU_2$ is referred to as "2". In addition, the standard type CPU unit $CU_1$ is referred to as "1", and the high function CPU unit $CU_2$ is referred to as "2".

First, in the most basic combination in which the standard type power supply unit $SU_1$ and the standard type CPU unit $CU_1$ are attached to the base board B' as shown in FIG. 11(a), the power supply connector $4_1$ of the power supply unit $SU_1$ is connected to the power supply connector 1 of the base board B', so that the slot-side identification signal terminals $3_1$ and $3_2$ and the unit-side identification signal terminals $5_1$ and $5_2$ are connected to each other respectively. In addition, the connector $6_1$ of the CPU unit $CU_1$ is connected to the connector $2_0$ provided in the slot 0 of the base board B', so that the slot-side identification signal terminals $3_3$ and $3_4$ and the unit-side identification signal terminals $5_5$ and $5_6$ are connected to each other respectively.

At this time, the slot-side identification signal terminal $3_3$ provided in the connector $2_0$ is connected to the ground through the unit-side identification signal terminals $5_5$, so that the identification signal $S_1$ becomes "0". On the other hand, the slot-side identification signal terminal $3_4$ is connected to the power source $V_{cc}$ through the unit-side identification signal terminals $5_6$ provided in the connector $6_1$ of the CPU unit $CU_1$, so that the identification signal $S_4$ becomes "1". Although connectors provided in the I/O units $IU_1, \ldots, IU_n$ are connected to the other connectors $2_1, \ldots, 2_n$ of the base board B', the connectors are not provided with any terminals to be connected to the slot-side identification signal terminals $3_5$ to $3_6$. Therefore, the identification signals $S_2$, $S_3$, $S_5$ and $S_6$ are left in their initial values "1", "0", "0" and "0", respectively.

Accordingly, the output $Q_1$ of the logic circuit $IC_1$ becomes "1", the output $Q_2$ of the logic circuit $IC_5$ becomes "1", and the output $Q_3$ of the logic circuit $IC_4$ becomes "0". Of them, the output $Q_1$ is a signal indicating whether the CPU unit $CU_1$ or $CU_2$ is connected to the base board B' or not. The output $Q_1$ takes "0" when the CPU unit $CU_1$ or $CU_2$ is not connected, and takes "1" when the CPU unit $CU_1$ or $CU_2$ is connected. That is, when the output $Q_1$ is "1", it is indicated that the base board B' functions as a fundamental base board. When the output $Q_1$ is "0", it is indicated that the base board B' functions as an extension base board.

Next, in the combination of the high capacity power supply unit $SU_2$ and the standard type CPU unit $CU_1$ as shown in FIG. 11(b), the power supply connector $4_2$ of the power supply unit $SU_2$ is connected to the power supply connector 1, so that the slot-side identification signal terminals $3_1$ and $3_2$ and the unit-side identification signal terminals $5_3$ and $5_4$ are connected to each other respectively. In addition, since the slot 0 of the base board B' is occupied by the power supply unit $SU_2$, the CPU unit $CU_1$ is attached to the slot 1. Then the connector $6_1$ is connected to the connector $2_1$ of the base board B', so that the slot-side identification signal terminals $3_5$ and $3_6$ and the unit-side identification signal terminals $5_5$ and $5_6$ are connected to each other respectively.

At this time, the connector $2_0$ is occupied by the power supply unit $SU_2$, and the slot-side identification signal terminal $3_3$ is connected to the power source $V_{cc}$. Therefore, the identification signal $S_1$ is left in initial value "1" thereof. On the other hand, the slot-side identification signal $3_4$ is connected to the power source $V_{cc}$ through the slot-side identification signal terminal $3_2$ of the power supply connector 1 and the unit-side identification signal terminal $5_4$ provided in the connector $4_2$ of the power supply unit $SU_2$. Therefore, the identification signal $S_4$ takes "1". In addition, the slot-side identification signal terminal $3_5$ provided in the connector $2_1$ is connected to the ground through the unit-side identification signal terminal $5_5$. Therefore, the identification signal $S_2$ takes "0". In addition, the slot-side identification signal terminal $3_6$ is connected to the power source $V_{cc}$ through the unit-side identification signal terminal $5_6$. Therefore, the identification signal $S_5$ takes "1". Although connectors provided in the I/O units $IU_1, \ldots, IU_{n-1}$ are connected to the other connectors $2_2, \ldots, 2_n$ of the base board B', the connectors are not provided with any terminals to be connected to the slot-side identification signal terminals $3_7$ to $3_8$. Therefore, the identification signals $S_3$ and $S_6$ are both left in initial values "0" thereof. Consequently, the output $Q_1$ of the logic circuit $IC_1$ becomes "1", the output $Q_2$ of the logic circuit $IC_5$ becomes "0", and the output $Q_3$ of the logic circuit $IC_4$ becomes "1".

Next, in the combination of the standard type power supply unit $SU_1$ and the high function CPU unit $CU_2$ as shown in FIG. 11(c), the power supply connector $4_1$ of the power supply unit $SU_1$ is connected to the power supply connector 1, so that the slot-side identification signal terminals $3_1$ and $3_2$ and the unit-side identification signal terminals $5_1$ and $5_2$ are connected to each other respectively. In addition, the connectors $6_2$ and $6_3$ of the CPU unit $CU_2$ are connected to the connectors $2_0$ and $2_1$ respectively, so that the slot-side identification signal terminals $3_3$ and $3_4$ and the unit-side identification signal terminals $5_7$ and $5_8$ are connected to each other respectively, and the slot-side identification signal terminals $3_5$ and $3_6$ and the unit-side identification signal terminals $5_9$ and $5_{10}$ are connected to each other respectively.

At this time, the slot-side identification signal terminal $3_3$ provided in the connector $2_0$ is connected to the ground through the unit-side identification signal terminal $5_7$. Therefore, the identification signal $S_1$ takes "0". In addition, the slot-side identification signal terminal $3_4$ is made open through the unit-side identification signal terminal $5_8$. Therefore, the identification signal $S_4$ takes "0". In addition, the slot-side identification signal terminal $3_5$ provided in the connector $2_1$ is connected to the power source $V_{cc}$ through the unit-side identification terminal $5_9$. Therefore, the identification signal $S_2$ takes "1". In addition, the slot-side identification signal terminal $3_6$ is connected to the power source $V_{cc}$ through the unit-side identification signal terminal $5_{10}$. Therefore, the identification signal $S_5$ also takes "1". Since connectors provided in the I/O units $IU_1, \ldots, IU_n$ are connected to the other connectors $2_2, \ldots, 2_n$ of the base board B', the identification signals $S_3$ and $S_6$ are both left in initial values "0" thereof Consequently, the output $Q_1$ of the logic circuit $IC_1$ becomes "1", the output $Q_2$ of the logic circuit $IC_5$ becomes "0", and the output $Q_3$ of the logic circuit $IC_4$ becomes "1".

Next, in the combination of the high capacity power supply unit $SU_2$ and the high function CPU unit $CU_2$ as shown in FIG. 11(d), the power supply connector $4_2$ of the power supply unit $SU_2$ is connected to the power supply connector 1, so that the slot-side identification signal terminals $3_1$ and $3_2$ and the unit-side identification signal terminals $5_3$ and $5_4$ are connected to each other respectively. In addition, since the slot 0 of the base board B' is occupied by the power supply unit $SU_2$, the CPU unit $CU_2$ is attached to the slots 1 and 2. Accordingly, the connectors $6_2$ and $6_3$ are connected to the connectors $2_1$ and $2_2$ of the base board B' respectively, so that the slot-side identification signal terminals $3_5$ and $3_6$ and the unit-side identification signal terminals $5_7$ and $5_8$ are connected to each other respectively, while the slot-side identification signal terminals $3_7$ and $3_8$ and the unit-side identification signal terminals $5_9$ and $5_{10}$ are connected to each other respectively.

At this time, the connector $2_0$ is occupied by the power supply unit $SU_2$, and the slot-side identification signal terminal $3_3$ is connected to the power source $V_{cc}$. Therefore, the identification signal $S_1$ is left in initial value "1" thereof In addition, the slot-side identification signal $3_4$ is connected to the power source $V_{cc}$ through the slot-side identification signal terminal $3_2$ of the power supply connector 1 and the unit-side identification signal terminals $5_4$ provided in the connector $4_2$ of the power supply unit $SU_2$. Therefore, the identification signal $S_4$ takes "1". In addition, the slot-side identification signal terminal $3_5$ provided in the connector $2_1$ is connected to the ground through the unit-side identification terminal $5_7$. Therefore, the identification signal $S_2$ takes "0". In addition, the slot-side identification signal terminal $3_5$ is made open through the unit-side identification signal terminal $5_8$. Therefore, the identification signal $S_5$ also takes "0". Further, the slot-side identification signal terminals $3_7$ and $3_8$ provided in the connector $2_2$ are connected to the power source $V_{cc}$ through the unit-side identification signal terminals $5_9$ and $5_{10}$ respectively. Therefore, both the identification signals $S_3$ and $S_6$ take "1". Consequently, the output $Q_1$ of the logic circuit $IC_1$, the output $Q_2$ of the logic circuit $IC_5$, and the output $Q_3$ of the logic circuit $IC_4$ all become "1".

Next, in the combination in which the standard type power supply unit $SU_1$ and the I/O units $IU_1, \ldots, IU_{n+1}$ are attached to the base board B' so that the base board B' functions as extension base board as shown in FIG. 11(e), the power supply connector $4_1$ of the power supply unit $SU_1$ is connected to the power supply connector 1, so that the slot-side identification signal terminals $3_1$ and $3_2$ and the unit-side identification signal terminals $5_1$ and $5_2$ are connected to each other respectively. In addition, connectors of the I/O units $IU_1, \ldots, IU_{n+1}$ are connected to the respective connectors $2_0, \ldots, 2_n$ in the slot 0 and the following slots.

At this time, the slot-side identification signal terminal $3_4$ provided in the connector $2_0$ is made open through the slot-side identification terminal $3_2$ and the unit-side identification terminals $5_2$ which are provided in the power supply connector 1. Therefore, the identification signal $S_4$ takes "0". On the other hand, the connectors provided in the I/O units $IU_1, \ldots, IU_{n+1}$ are connected to the connectors $2_0, \ldots, 2_n$. Accordingly, the identification signals $S_1$ to $S_3$, $S_5$ and $S_6$ are left in initial values thereof "1", "1", "0", "0" and "0", respectively. As a result, the output $Q_1$ of the logic circuit $IC_1$, the output $Q_2$ of the logic circuit $IC_5$, and the output $Q_3$ of the logic circuit $IC_4$ all become "0".

Lastly, in the combination in which the high capacity power supply unit $SU_2$ and the I/O units $IU_1, \ldots, IU_n$ are attached to the base board B' so that the base board B' functions as extension base board as shown in FIG. 11(f), the power supply connector $4_2$ of the power supply unit $SU_2$ is connected to the power supply connector 1, so that the slot-side identification signal terminals $3_1$ and $3_2$ and the unit-side identification signal terminals $5_3$ and $5_4$ are connected to each other respectively. In addition, since the slot 0 of the base board B' is occupied by the power supply unit $SU_2$, the I/O units $IU_1, \ldots, IU_n$ are attached to the slot 1 et seq.

At this time, since the connector $2_0$ is occupied by the power supply unit $SU_2$, and the slot-side identification signal terminal $3_3$ is connected to the power source $V_{cc}$. Therefore, the identification signal $S_1$ is left in its initial value "1". Since the slot-side identification signal $3_4$ is connected to the power source $V_{cc}$ through the slot-side identification signal terminal $3_2$ of the power supply connector 1 and the unit-side identification signal terminals $5_4$ provided in the connector $4_2$ of the power supply unit $SU_2$. Therefore, the identification signal $S_4$ takes "1". Since the connectors provided in the I/O units $IU_1, \ldots, IU_n$ are connected to the connectors $2_1$ and $2_2$, the identification signals $S_2$, $S_3$, $S_5$ and $S_6$ are left in initial values thereof "1", "0", "0" and "0", respectively. As a result, the output $Q_1$ of the logic circuit $IC_1$ becomes "0", the output $Q_2$ of the logic circuit $IC_5$ becomes "1", and the output $Q_3$ of the logic circuit $IC_4$ becomes "0".

The base board B' in this embodiment is provided with an adder 11 for adding selection signals US0 to US2 for selecting the slots 0 to 7 to a signal taking the output signal $Q_2$ as its least significant digit and the output signal $Q_3$ as its higher digit, and a decoder 12 for decoding outputs of the adder 11 to obtain selection signals for selecting the slots 0 to 7, in the same manner as that in the first embodiment. Consequently, with respect to the same selection signals US0 to US2, different select signals can be outputted in accordance with the slots 0, . . . , n to which the I/O unit $IU_1, \ldots, IU_n$ are attached, even when two kinds of power supply units $SU_1$ and $SU_2$ different in width and two kinds of CPU units $CU_1$ and $CU_2$ different in width are attached to the base board B' in the 6 combinations as mentioned above. That is, in addition to the case in which only the width of the power supply unit is changed can be coped with in the structure described in the first embodiment, the case in which the width of the power supply unit $SU_1$ or $SU_2$ and the width of the CPU unit $CU_1$ or $CU_2$ are changed at the same time can be also coped with by supplying corrected signals $Q_2$ and $Q_3$ into the adder 11 as in this embodiment.

For example, assume that the selection signals US0 to US2 indicate "000" for selecting the I/O unit $IU_1$ corresponding to the select number 1. In this case, in the combination shown in FIG. 11(a), the output of the adder 11 takes "001" to thereby select the slot 1. In the combinations shown in FIGS. 11(b) and 11(c), the output of the adder 11 takes "010" to thereby select the slot 2. In the combination shown in FIG. 11(d), the output of the adder 11 takes "011" to thereby select the slot 3. In the combination shown in FIG. 11(e), the output of the adder 11 takes "000" to thereby select the slot 0. In the combination shown in FIG. 11(f), the output of the adder 11 takes "001" to thereby select the slot 1. In any combination, the slot to which the I/O unit $IU_1$ of the select number 1 to be attached can be always selected properly.

Further, in the base board B' in this embodiment, buffer circuits $14_1$ to $14_4$ which can switch the signal transmission directions of a data bus DB, an address bus AB and a control signal line CL are provided in the upstream of an extension connector 13 as shown in FIG. 4, in the same manner as that in the first embodiment. Of them, the buffer circuits $14_2$ and $14_3$ for the address bus AB and the buffer circuit $14_4$ for the control signal line CL are designed so that the signal transmission directions thereof can be switched in response to the output signal $Q_1$. That is, when the output signal $Q_1$ takes "1", respective signals are outputted to the extension connector 13 so that the base board B' functions as a fundamental base board. When the output signal $Q_1$ takes "0", respective signals are inputted from the extension connector 13 so that the base board B' functions as an extension base board.

As has been described above, in this embodiment, it can be judged from the output signal $Q_1$ of the logic circuit $IC_1$ whether the base board B' is a fundamental base board or an extension base board. In addition, the width (or kind) of the power supply unit $SU_1$ or $SU_2$ attached thereto and the width (or kind) of the CPU unit $CU_1$ or $CU_2$ attached thereto can be judged from the combination of the output signal $Q_2$ of the logic circuit $IC_5$ and the output signal $Q_3$ of the logic circuit $IC_4$. Accordingly, the slots to which the I/O units $IU_1, \ldots, IU_n$ and so on are attached can be recognized properly in the CPU unit $CU_1$ or $CU_2$ not only in the case where the width of the power supply unit $SU_1$ or $SU_2$ is changed but also in the case where the width of the CPU unit $CU_1$ or $CU_2$ is changed. In such a manner, on the same base board B', the widths of the power supply units $SU_1$ and $SU_2$ and the CPU units $CU_1$ and $CU_2$ can be changed respectively. In addition, the same base board B' can be made to function not only as a fundamental base board but also as an extension base board. Accordingly, it is possible to realize the improvement of the functions and the rationalization thereof.

As has been described heretofore, according to the present invention, it is possible to obtain different identification signals respectively when the widths of the power supply unit and the CPU unit occupying the slots of the base board are changed independently, or when the CPU unit is not attached. Accordingly, even in such a case, it is possible to properly recognize the slots to which I/O units and so on are attached.

According to the present invention, one and the same base board can be used in common both as a fundamental base board and an extension base board in accordance with the presence or absence of attachment of the CPU unit.

Furthermore, according to the present invention, the foregoing effects can be obtained by means of simple circuit configuration.

What is claimed is:

1. A programmable controller system comprising:
    a base board having a plurality of slots;
    a power supply unit connected to at least one of the slots for supplying power to the base board;
    at least one I/O unit connected to any of the remaining slots for executing I/O processing;
    a control signal terminal on the base board, which receives an I/O unit specification signal identifying a selected I/O unit;
    discrimination means for recognizing the number of slots that the at least one I/O unit is shifted based on the quantity of slots occupied by the power supply unit;
    correction means for correcting the I/O unit specification signal based on number of slots that the at least one I/O unit is shifted as recognized by the discrimination means; and
    selection means for selecting one actual slot in which the I/O unit specified by the I/O unit specification signal is attached based on the corrected I/O specification signal.

2. The programmable controller system as set forth in claim 1, wherein the discrimination means includes a first circuit having an unchanged configuration, and a second circuit having a variable configuration according to the number of slot occupied by the power supply unit, and
    wherein the amount of shifted position of the I/O unit is uniquely determined by a combination of the first circuit and the second circuit.

3. The programmable controller system as got forth in claim 2, wherein the first circuit is a logic circuit provided on the base board and the second circuit is provided in the power supply unit, and
    wherein the first circuit and the second circuit uniquely form a discrimination circuit outputting a discrimination signal to the correction means when the power supply unit is attached to the base board.

4. The programmable controller system of claim 1, wherein said correction means comprises:
    an adder connected for adding an uncorrected I/O unit selection signal and an output signal from the discriminating means;
    a decoder connected to receive the output from the adder, and produce the corrected I/O unit selection signal.

5. The programmable controller system of claim 1, further comprising:
    a means to recognize whether a CPU unit is connected to the baseboard.

6. A programmable controller system comprising:
    a base board having a plurality of slot;
    a power supply unit attached to at least one of the slots for supplying power to the base board;
    a CPU unit attached to at least one of the slots for outputting an I/O unit specification signal for specifying one executing I/O unit from among at least one I/O unit attached to ones of the remaining slots for executing I/O processing;
    discrimination means for discriminating amount of shifted position of the I/O unit which is changed in accordance with number of slot occupied by the power supply unit and the CPU unit;
    correction means for correcting the I/O unit specification signal based on the amount of shifted position of the I/O unit discriminated by the discrimination means;
    selection means for selecting one actual slot in which the I/O unit specified by the I/O unit specification signal is attached based on the corrected I/O specification signal.

7. The programmable controller system as set forth in claim 6, wherein the discrimination means includes a first circuit having an unchanged configuration, a second circuit having a variable configuration according to the number of slot occupied by the power supply unit, and a third circuit having a variable configuration according to the number of slot occupied by the CPU unit, and
    wherein the amount of shifted position of the I/O unit is uniquely determined by a combination of the first circuit, the second circuit, and the third circuit.

8. The programmable controller system as set forth in claim 7, wherein the first circuit is a logic circuit provided on the base board, the second circuit is provided in the power supply unit, and the third circuit is provided in the CPU unit, and
    wherein the first circuit, the second circuit and the third circuit uniquely form a discrimination circuit outputting a discrimination signal to the correction means when the power supply unit is attached to the base board.

9. The programmable controller system of claim 6, wherein said correction means comprises:
    an adder connected for adding an uncorrected I/O unit selection signal and an output signal from the discriminating means;
    a decoder connected to receive the output from the adder, and produce the corrected I/O unit selection signal.

10. The programmable controller system of claim 6, further comprising a means to recognize whether a CPU unit is connected to the baseboard.

11. A method for switching a function of a base board in a programmable controller system comprising the steps of:

attaching a power supply unit for supplying power to the base board to at least one of a plurality of slots provided on the base board;

attaching removably to one of the slot a CPU unit for outputting an I/O unit specification signal for specifying one executing I/O unit from among at least one I/O unit attached to ones of the remaining slots for executing I/O processing;

detecting whether the CPU unit is attached to the base board;

when presence of attachment of the CPU unit is detected, discriminating amount of shifted position of the I/O unit which is changed in accordance with number of slot occupied by the power supply unit and the CPU unit;

correcting the I/O unit specification signal based on the amount of shifted position of the I/O unit discriminated by the discrimination means;

selecting one actual slot in which the I/O unit specified by the I/O unit specification signal is attached based on the corrected I/O specification signal; and switching a control signal terminal provided on the base board as an output terminal, and when absence of attachment of the CPU unit is detected, switching the control signal terminal as an input terminal and taking in the I/O unit specification signal from an external unit through the control terminal;

discriminating amount of shifted position of the I/O unit which is changed in accordance with number of slot occupied by the power supply unit;

correcting the I/O unit specification signal based on the amount of shifted position of the I/O unit discriminated by the discrimination means; and selecting one actual slot in which the I/O unit specified by the I/O unit specification signal is attached based on the corrected I/O specification signal.

12. The method for switching a function of a base board as set forth in claim 11, wherein when the absence of the CPU unit is detected, the amount of shifted position of the I/O unit is uniquely determined by combining a first circuit and a second circuit, the first circuit is provided in the base board with a unchanged configuration and the second circuit is provided in the power supply unit with a various configuration according to the number of slot occupied by the power supply unit.

13. The method for switching a function of a base board as set forth in claim 11, wherein when the presence of the CPU unit is detected, the amount of shifted position of the I/O unit is uniquely determined by combining a first circuit, a second circuit, and a third circuit, the first circuit is provided in the base board with a unchanged configuration, the second circuit is provided in the power supply unit with a various configuration according to the number of slot occupied by the power supply unit, and the third circuit is provided in the CPU unit with a various configuration according to the number of slot occupied by the CPU unit.

* * * * *